(12) United States Patent
Kim (10) Patent No.: US 12,275,200 B2
(45) Date of Patent: Apr. 15, 2025

(54) MOLDING APPARATUS FOR GRP DOOR SKIN

(71) Applicant: SUNGIL CO., LTD., Gyeongsangnam-do (KR)

(72) Inventor: Sung Jin Kim, Busan (KR)

(73) Assignee: SUNGIL CO., LTD., Gyeongsangnam-do (KR)

( * ) Notice: Subject to any disclaimer, the term of this patent is extended or adjusted under 35 U.S.C. 154(b) by 0 days.

(21) Appl. No.: 18/259,789

(22) PCT Filed: Apr. 24, 2023

(86) PCT No.: PCT/KR2023/005523
§ 371 (c)(1),
(2) Date: Jun. 29, 2023

(87) PCT Pub. No.: WO2023/211079
PCT Pub. Date: Nov. 2, 2023

(65) Prior Publication Data
US 2024/0190086 A1 Jun. 13, 2024

(30) Foreign Application Priority Data
Apr. 27, 2022 (KR) ........................ 10-2022-0052057

(51) Int. Cl.
| | | |
|---|---|---|
| *B29C 70/54* | (2006.01) |
| *B29C 37/00* | (2006.01) |
| *B29C 70/42* | (2006.01) |
| *B30B 7/02* | (2006.01) |
| *B29C 31/00* | (2006.01) |
| *B29C 31/08* | (2006.01) |
| *B29C 37/02* | (2006.01) |
| *B29L 31/00* | (2006.01) |
| *E06B 3/70* | (2006.01) |

(52) U.S. Cl.
CPC .......... *B29C 70/42* (2013.01); *B29C 37/0007* (2013.01); *B29C 70/541* (2013.01); *B29C 70/545* (2013.01); *B30B 7/023* (2013.01); *B29C 31/008* (2013.01); *B29C 31/08* (2013.01); *B29C 37/02* (2013.01); *B29C 2793/009* (2013.01); *B29L 2031/724* (2013.01); *E06B 3/7001* (2013.01)

(58) Field of Classification Search
CPC ......... B30B 7/023; B29C 31/08; B29C 37/02; B29L 2031/724; E06B 3/7001
See application file for complete search history.

(56) References Cited

U.S. PATENT DOCUMENTS

2013/0340926 A1\* 12/2013 Liang ..................... B32B 7/14
156/196

FOREIGN PATENT DOCUMENTS

| JP | 2016155356 A | 9/2016 |
| KR | 101417717 B1 | 7/2014 |
| KR | 101497056 B1 | 3/2015 |
| KR | 101685883 B1 | 12/2016 |

(Continued)

*Primary Examiner* — Scott W Dodds
(74) *Attorney, Agent, or Firm* — Bayramoglu Law Offices LLC (57) ABSTRACT

A molding apparatus for a GRP door skin is provided. The molding apparatus is configured to form a GRP door skin of a completed product by molding a GRP door skin in a forming mold, and inserting the formed GRP door skin into a trimming removing part through a robot.

2 Claims, 12 Drawing Sheets

(56) References Cited

FOREIGN PATENT DOCUMENTS

| KR | 20180046948 A | 5/2018 |
|---|---|---|
| KR | 102300281 B1 | 9/2021 |

* cited by examiner

MOLDING APPARATUS FOR GRP DOOR SKIN

CROSS REFERENCE TO THE RELATED APPLICATIONS

This application is the national phase entry of International Application No. PCT/KR2023/005523, filed on Apr. 24, 2023, which is based upon and claims priority to Korean Patent Application No. 10-2022-0052057, filed on Apr. 27, 2022, the entire contents of which are incorporated herein by reference.

TECHNICAL FIELD

The present disclosure relates to a molding apparatus for a glass fiber reinforced plastic (GRP) door skin. More particularly, the present disclosure relates to a molding apparatus for a GRP door skin configured to form a GRP door skin in a completed product by molding a GRP door skin in a forming mold, and then inserting the formed GRP door skin into a trimming removing part through a robot.

BACKGROUND

In general, a synthetic resin door installed at an entrance of a general house or an office is completed by molding a frame suitable for a shape of the entrance and attaching a synthetic resin decorative panel with a pattern of a certain shape suitable for a user's taste to an outer surface of the frame with an adhesive.

Furthermore, the synthetic resin decorative panel is formed of materials that are light but durable, such as GRP (Glass—Fiber Reinforced Plastics, Glass—Fiber Reinforced Polyester Resin) and ENM (Elvan Nephrite Marlle), which are lightweight and durable materials. The GRP and ENM are made into panels (plates) of a certain shape by SMC (GRP Sheet Molding Compound) compression molding, one of the molding techniques for shaping products.

As the representative related art about a door using a GRP panel, Korean Intellectual Property Office Korean Patent No. 10-1497056 (Title: A door for crime prevention) can serve as an example.

The door of the related art includes: a pair of front and rear GRP panels that have fire resistance and constitute front and rear surfaces of the door in a plate shape; protruding frames protruding from opposite side portions of inner surfaces of the front and rear GRP panels; a metal plate fitted between the front and rear GRP panels and tightly fixed to inner surfaces of the protruding frames of the front and rear GRP panels and reinforcing bending of the front and rear GRP panels; a fire-resistant wood having a protruding step fitted into an insertion space between the protruding frames of the front and rear GRP panels and fixed with a fastening pin while being in close contact with outer surfaces of the protruding frames of the front and rear GRP panels; an adhesive applied to contact surfaces between the front and rear GRP panels and the fire-resistant wood; and flame retardant urethane foam filled into a space between the front and rear GRP panels and providing sound insulation.

Meanwhile, when the GRP panel (GRP skin) constituting the surfaces of the GRP panel door is formed in the forming mold, burrs are inevitably generated along a circumferential surface of the GRP panel. Therefore, a burr removing process proceeds on the formed GRP panel.

However, conventionally, the GRP panel molding process and the burr removing process for the formed GRP panel could not be continuously performed through automation.

Specifically, the burr removing process is often performed manually by a worker using a tool such as a grinder, etc., so that poor workability and productivity may occur.

DOCUMENT OF RELATED ART (Patent Document 1): Korean Intellectual Property Office Korean Patent No. 10-1497056

SUMMARY

Technical Problem

Accordingly, an objective of the present disclosure for solving the problem mentioned above is intended to provide a molding apparatus for a GRP door skin configured to form a GRP door skin of a completed product by molding a GRP door skin in a forming mold, and then inserting the formed GRP door skin into a trimming removing part by a robot.

Technical Solution

In order to achieve the above-described objective, according to an aspect of the present disclosure, there is provided a molding apparatus for a GRP door skin, the molding apparatus including: a driving pulley configured to be rotated by power of a motor; a driven pulley located below the driving pulley to be spaced from each other at a predetermined distance; a chain configured to be rotatably moved while being wound on the driving and driven pulleys; a GRP sheet supply part including a holding frame provided at the chain to be spaced apart from another holding frame at a predetermined distance, where while holding a GRP sheet, the holding frame may be rotatably moved by riding on the chain; a robot arm located in rear of the GRP sheet supply part and configured to be operated according to a control signal preset in a control unit; a plate provided at the robot arm; a GRP sheet inserting and GRP panel removal part including a first absorber installed on a first surface of the plate and configured to absorb the GRP sheet held by the holding frame; a lower mold located in rear of the GRP sheet inserting and GRP panel removal part and configured to allow the GRP sheet absorbed by the first absorber to be placed thereon; a forming mold including an upper mold configured to be joined to the lower mold while being located above the lower mold, and configured to form the GRP sheet into a GRP door skin; a second absorber provided at a second surface of the plate and configured to take out the GRP door skin formed in the forming mold outwards from the forming mold with movement of the robot arm; a housing located at one side space of the forming mold and having a working space therein; a raising and lowering stand provided in the working space of the housing and configured to be supplied with the GRP door skin taken out from the forming mold and to securely absorb the supplied GRP door skin with an absorber; a belt located below the raising and lowering stand and configured to support the GRP door skin lowered by vertical movement of the raising and lowering stand; a conveyor unit including driving and driven pulleys provided at opposite ends of the belt and configured to rotatably move the belt 66 by power of the motor; a rack gear provided along an outer portion of bottom of the housing; a pinion engaged with the rack gear and configured to be rotated by power of a motor; a reciprocating stand supporting the motor and configured to reciprocate on the rack gear with rotation of the pinion; and a trimming work part including a cutting unit including a cutting blade provided at the reciprocating stand and configured to reciprocate along outer surfaces of the GRP door skin with operation of the reciprocating stand and configured to remove burrs generated on the outer surface of the GRP door skin.

The cutting unit may include four cutting units having the same structure, the four cutting units being provided at front, rear, left, and right portions of the bottom of the housing to simultaneously remove the burrs generated on the outer surfaces of the GRP door skin.

Advantageous Effects

The present disclosure is configured to form the GRP door skin of a completed product by molding a GRP door skin in the forming mold, and inserting the formed GRP door skin into the trimming removing part through the robot, so that the present disclosure has the operational effect that can improve the marketability by improving workability and productivity according to molding of the GRP door skin, and minimizing a detect rate.

DESCRIPTION OF REFERENCE NUMERALS

| | |
|---|---|
| 1: GRP sheet | 2: GRP panel |
| 10: GRP sheet supply part | 19: holding frame |
| 30: GRP sheet inserting and GRP door skin removing part | |
| 32: robot arm | 34: plate |
| 36: first absorber | 38: second absorber |
| 40: forming mold | 42: upper mold |
| 44: lower mold | 50: trimming work part |
| 52: raising and lowering stand | |
| 54: absorber | |
| 56: driving cylinder | 60: conveyor unit |
| 66: belt | 70: cutting unit |

DETAILED DESCRIPTION OF THE EMBODIMENTS

Hereinbelow, an exemplary embodiment of the present disclosure will be described with reference to accompanying drawings. In the detailed description described below, a representative embodiment of the present disclosure for achieving the above described technical problem will be proposed. Furthermore, other embodiments that may be proposed as the present disclosure will be replaced with descriptions in the present disclosure.

A molding apparatus for a GRP door skin of the present disclosure is configured to perform molding of a GRP door skin by primarily molding a GRP door skin corresponding to each of front and rear surfaces of a GRP door in the forming mold, inserting the formed GRP door skin into a trimming removing part through a robot to automatically remove burrs formed on outer surfaces of the GRP door skin, and then take out the GRP door skin of a completed product and successively stack the GRP door skin in a carrying box.

The GRP door manufactured using a GRP door skin is composed of a pair of GRP door skins providing a front surface and a rear surface of the GRP door, a wood frame provided between the pair of GRP door skins and generating a space between the GRP door skins, and flame retardant urethane foam filled in the space generated between the GRP door skins.

Hereinbelow, apparatus of molding a GRP door skin constituting each of the front and rear surfaces of the GRP door will be described with reference to accompanying drawings.

Figure 1:
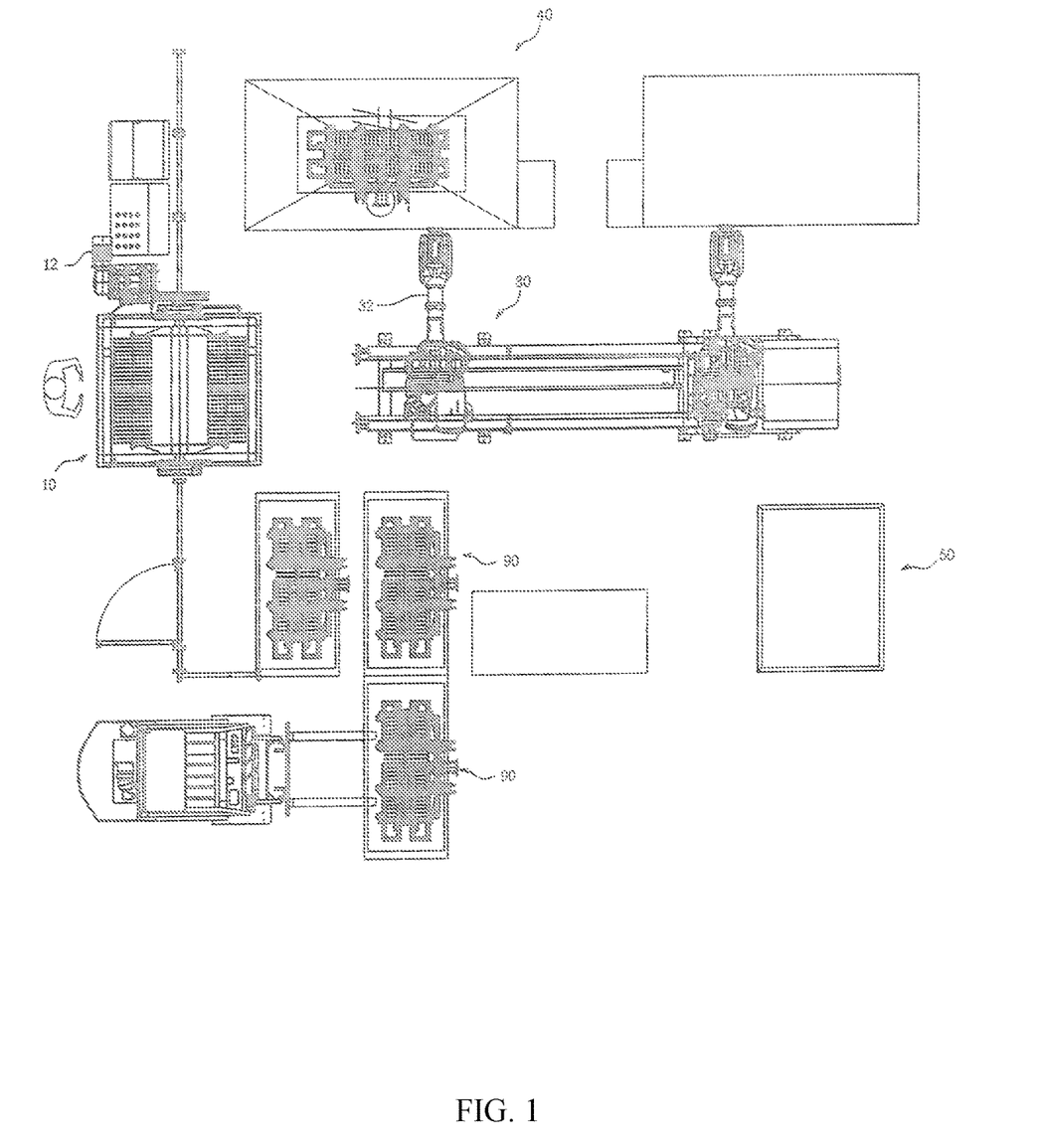
FIG. 1 is a plan view showing entire configuration of a molding apparatus for a GRP door skin according to the present disclosure.

Accompanying FIG. 1 is a view showing the entire configuration of the molding apparatus for a GRP door skin.

As shown in FIG. 1, the molding apparatus for a GRP door skin of the present disclosure includes a GRP sheet supply part 10, a GRP sheet inserting and GRP door skin removing part 30, a forming mold 40, and a trimming work part 50.

The GRP sheet supply part 10 is a means provided to supply a GRP sheet 1 that is a material of a GRP door skin formed in a forming mold 40.

Figure 3:
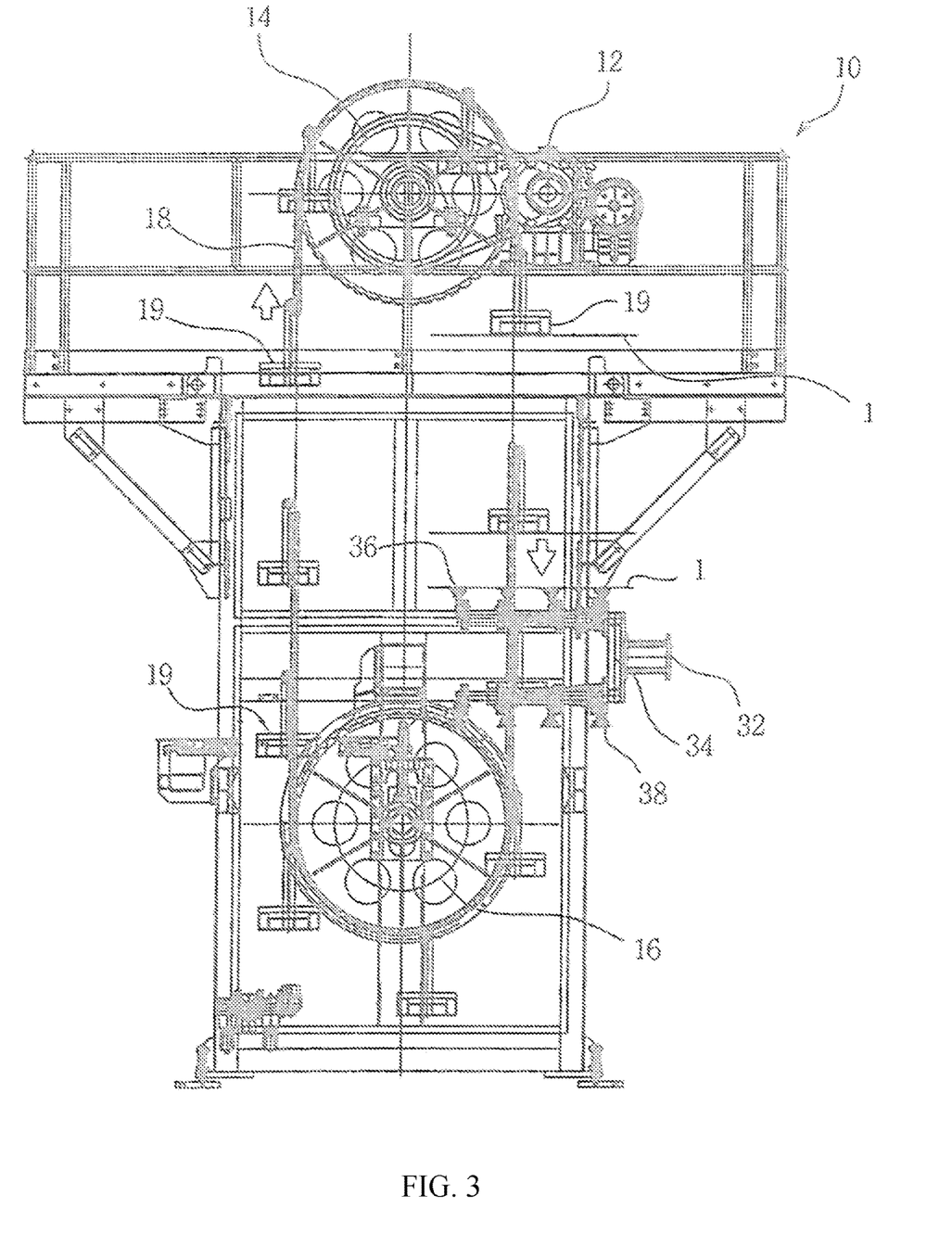
FIG. 3 is a view showing the GRP sheet supply part of FIG. 2.

As shown in FIG. 3, the GRP sheet supply part 10 includes a driving pulley 14 rotated by power of a motor 12, a driven pulley 16 located below the driving pulley 14 to be spaced apart from each other at a predetermined distance, a chain 18 wound on both the driving and driven pulleys 14 and 16 and configured to be rotatably moved, and a holding frame 19 installed at the chain 18 to be spaced apart from another holding frame and on which the GRP sheet 1 is placed.

The GRP sheet supply part 10 is configured such that, when a worker places the GRP sheet 1 on the holding frame 19, the driving and driven pulleys 14 and 16 are rotated by power of the motor 12. In this process, the chain 18 rotatably moves the holding frame 19 to automatically move the GRP sheet 1 to an approach location of a robot arm 32 constituting the GRP sheet inserting and GRP door skin removing part 30.

The GRP sheet inserting and GRP door skin removing part 30 is a unit configured to clamp the GRP sheet 1 held by the holding frame 19 of the GRP sheet supply part 10 and to insert the GRP sheet 1 into the forming mold 40, and furthermore, to take out a GRP door skin 2 formed from the forming mold 40 and to supply the GRP door skin 2 to the trimming work part 50.

Figure 2:
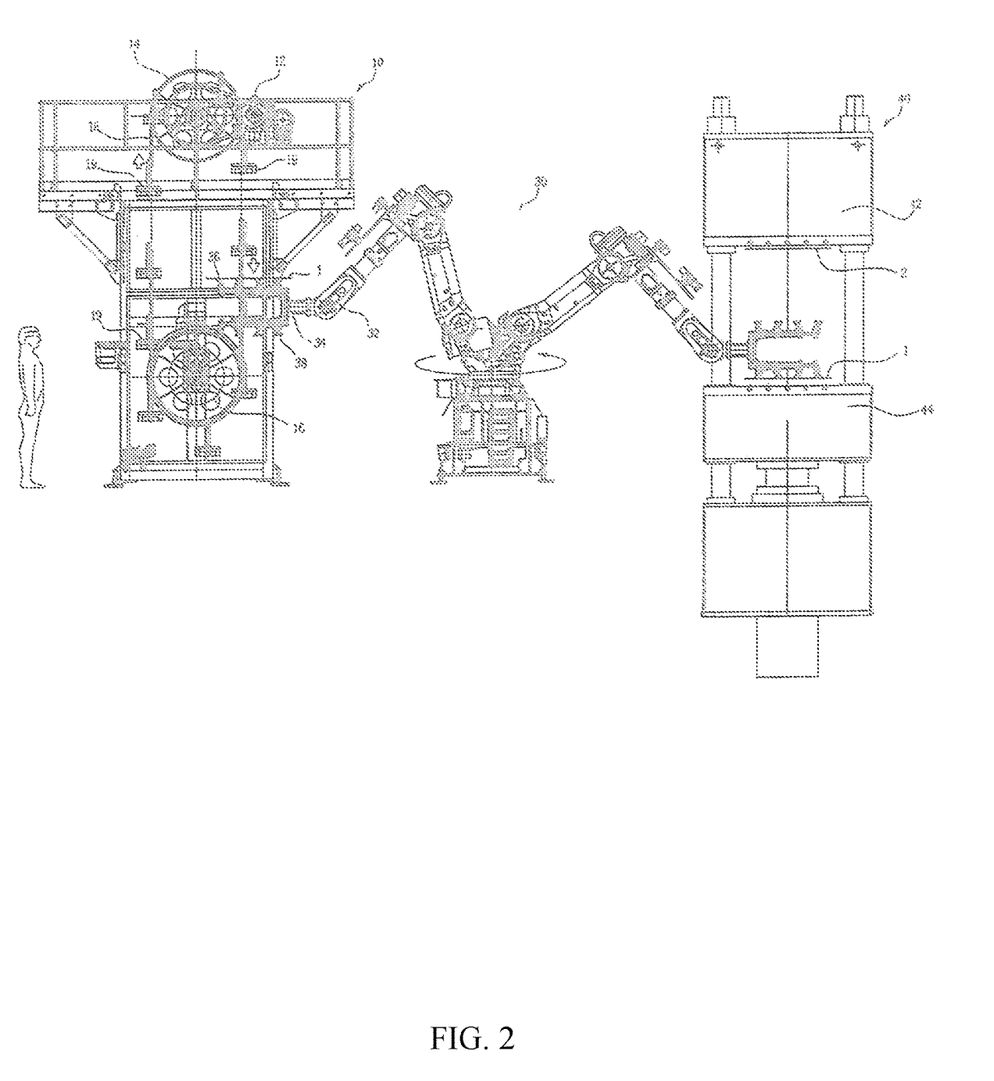
FIG. 2 is a side view showing a GRP sheet supply part, a GRP sheet inserting and GRP door skin removing part, and a forming mold in FIG. 1.
Figure 4:
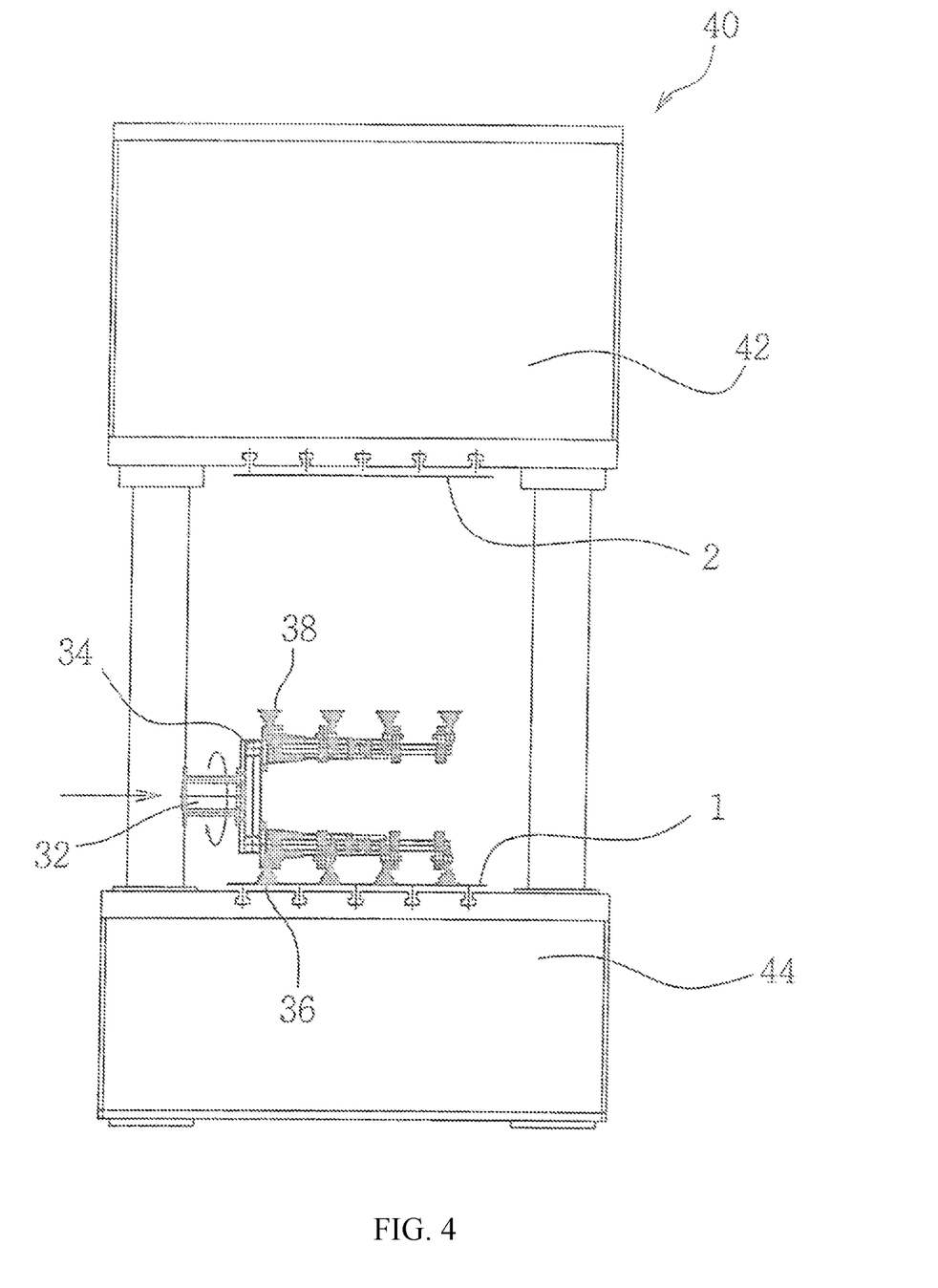
FIGS. 4 to 6 are views showing a process in which a GRP sheet is supplied from the GRP sheet inserting and GRP door skin removing part to the forming mold and a GRP door skin is taken out.

As shown in FIGS. 2 to 4, the GRP sheet inserting and GRP door skin removing part 30 includes the robot arm 32, a plate (34 installed at the robot arm 32 and configured to perform moving and reverse movement with movement of the robot arm 32, a first absorber 36 installed at a first surface of the plate 34 and configured to absorb the GRP sheet 1 held by the holding frame 19, and a second absorber 38 installed at a second surface of the plate 34 and configured to absorb the GRP door skin 2 completed in molding in the forming mold 40.

The first absorber 36 absorbs the GRP sheet 1 held by the holding frame 19 of the GRP sheet supply part 10, and then after the plate 34 enters a space between the upper and lower molds 42 and 44 of the forming mold 40 with movement of the robot arm 32, the first absorber 36 inserts the absorbed GRP sheet 1 onto the lower mold 44 that is the forming mold 40. The first absorber 36 absorbs the GRP sheet 1 through suctioning of air, and when suctioning operation is stopped, the first absorber 36 eliminates absorption of the GRP sheet 1.

After the first absorber 36 places the GRP sheet 1 on the lower mold 44, the second absorber 38 absorbs the GRP door skin 2 inserted in a molding completion state from a core of the upper mold 42. Next, with movement of the robot arm 32, the first absorber 36 takes out the GRP door skin 2 from the forming mold 40 and then supplies the GRP door skin 2 to the trimming work part 50.

As shown in FIGS. 2 to 6, the forming mold 40 includes the upper and lower molds 42 and 44 separated from each other, and forms the GRP sheet 1 inserted by the GRP sheet inserting and GRP door skin removing part 30, into the GRP door skin.

Figure 5:
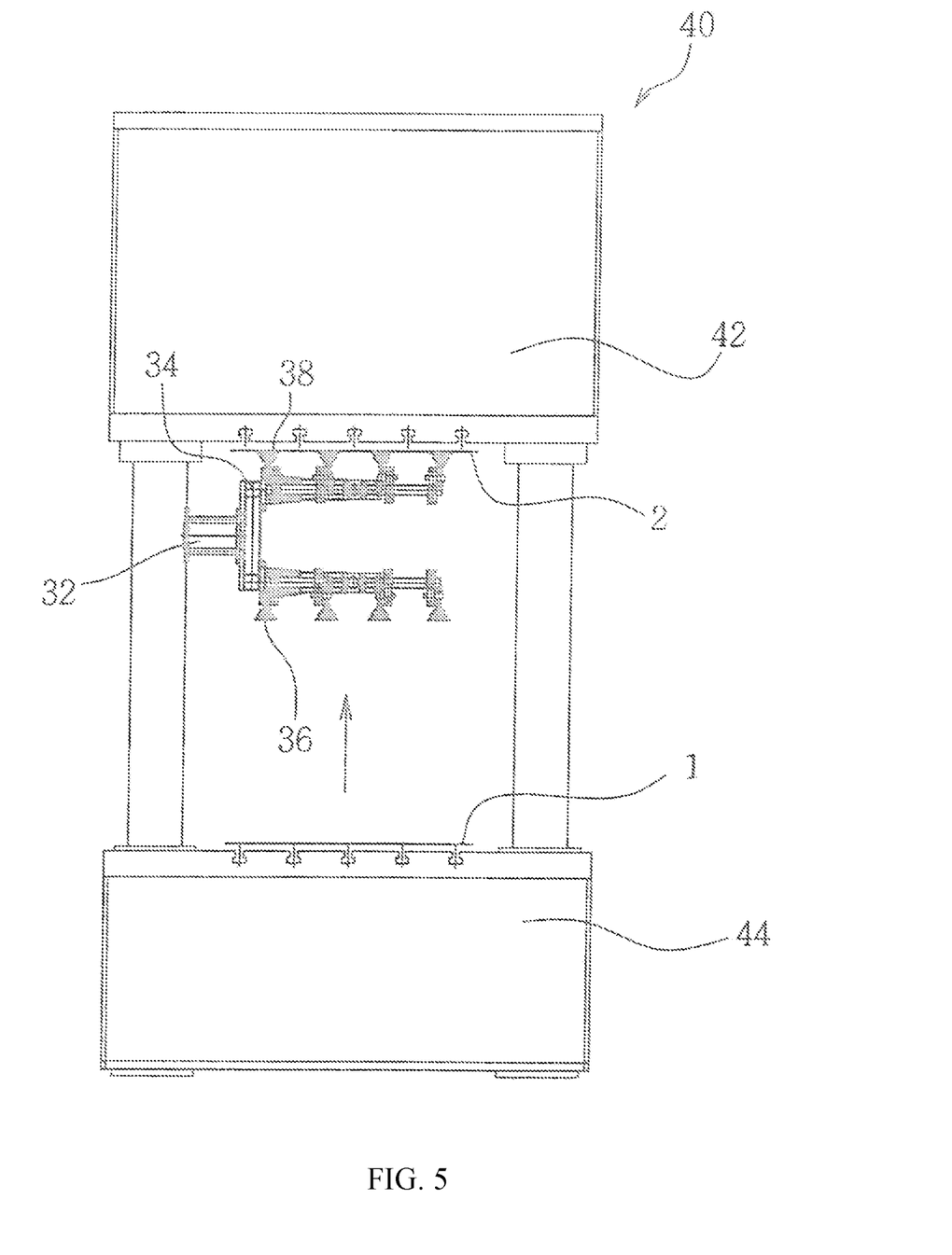
Figure 6:
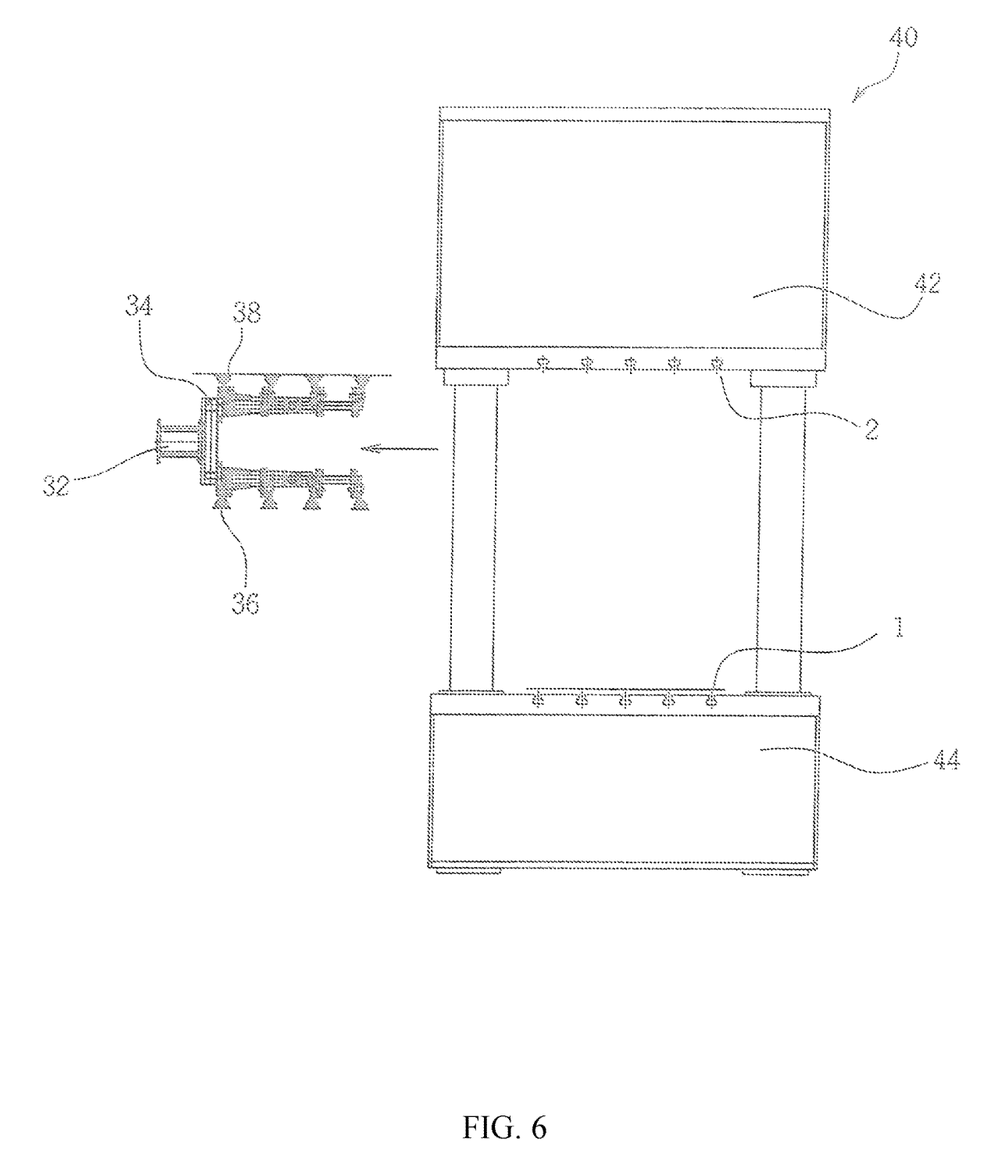

At this point, the GRP sheet 1 placed on the lower mold 44 is formed into the GRP door skin 2 as the upper and lower molds 42 and 44 join to each other, and the formed GRP door skin 2 located in a core of the upper mold 42 is taken out from the forming mold 40 with movement of the GRP sheet inserting and GRP door skin removing part 30. In other words, the GRP sheet inserting and GRP door skin removing part is operated to allow the robot arm to place the GRP sheet 1 absorbed by the first absorber 36 on the lower mold 44, as shown in FIG. 5, and then the GRP sheet inserting and GRP door skin removing part is operated to allow the second absorber 38 to absorb the GRP door skin 2 completed in molding in the upper mold 42 and then take out the absorbed GRP door skin 2 from the forming mold 40 with movement of the robot arm 32, as shown in FIG. 6.

While receiving the GRP door skin 2 taken out from the GRP sheet inserting and GRP door skin removing part 30, the trimming work part 50 serves to remove trimmings 4 such as burrs formed on a circumferential surface of the GRP door skin 2 in a process of molding the GRP door skin 2.

Figure 7:
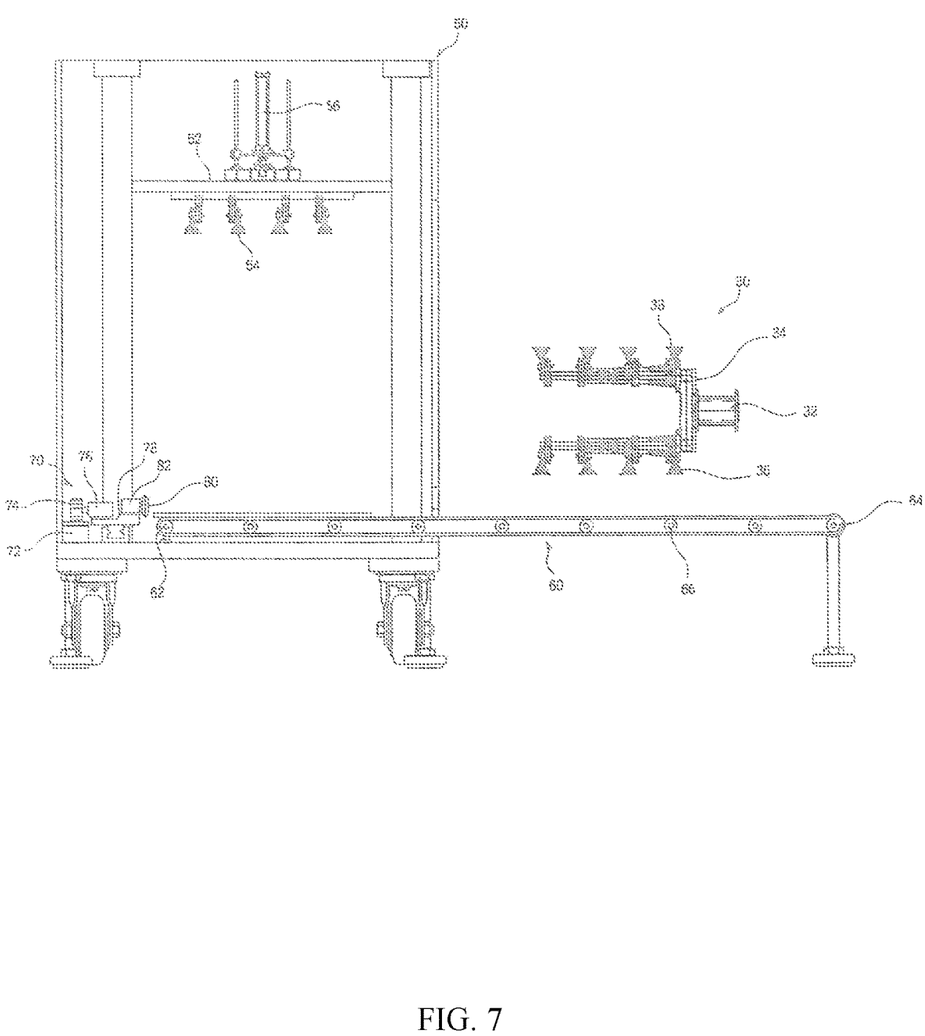
FIG. 7 is a view showing a structure of a trimming work part.
Figure 8:
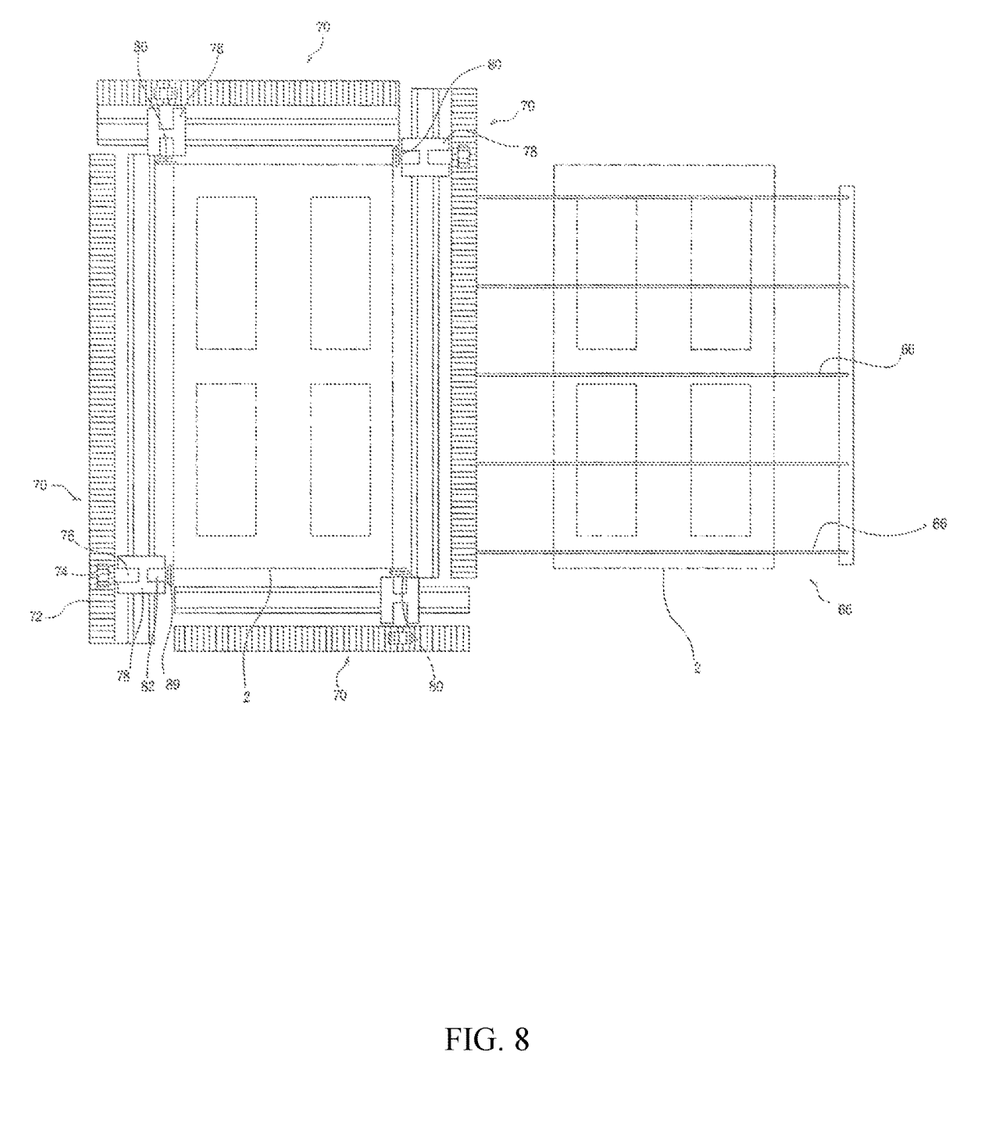
FIG. 8 is a plan view of FIG. 7.
Figure 9:
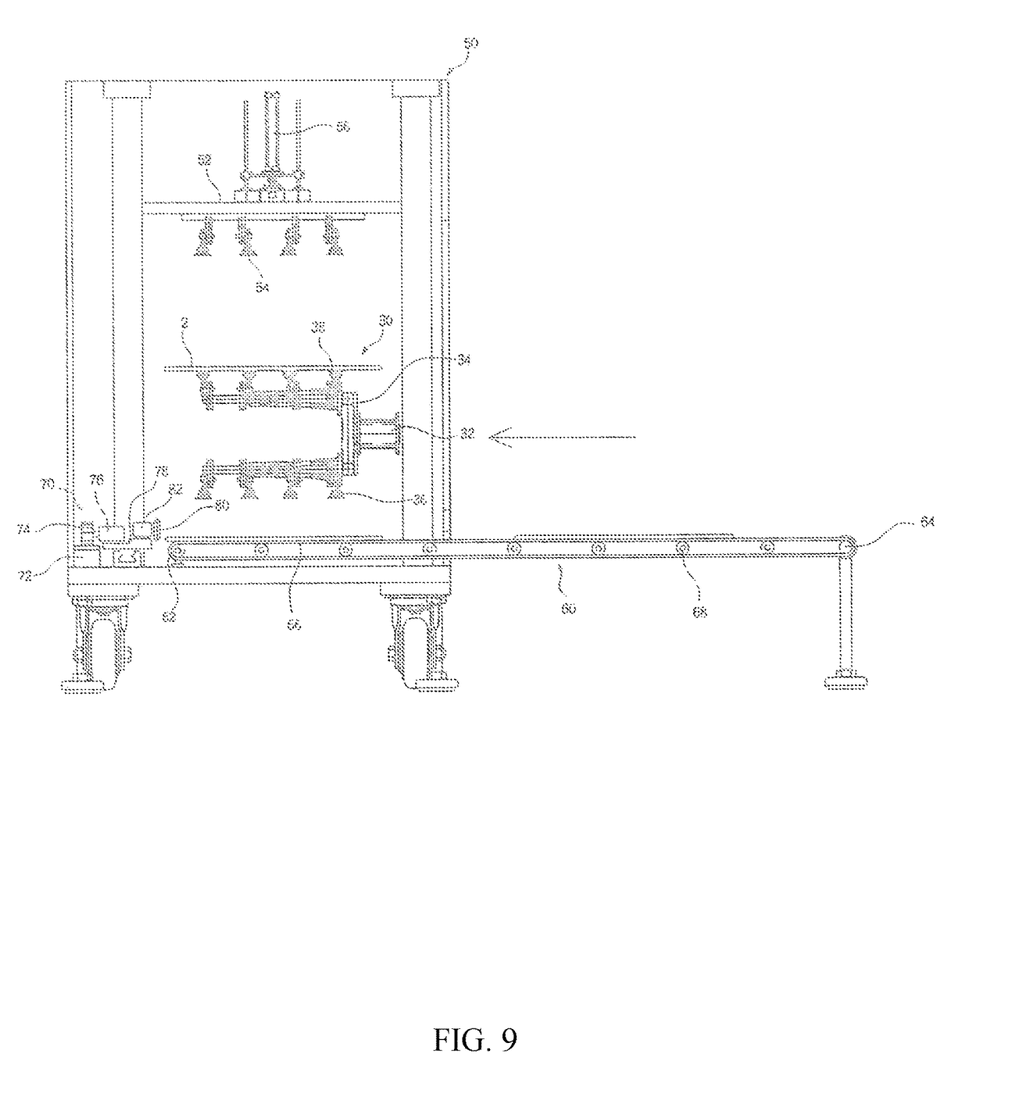
FIGS. 9 to 12 are views successively showing a work process of the trimming work part.
Figure 10:
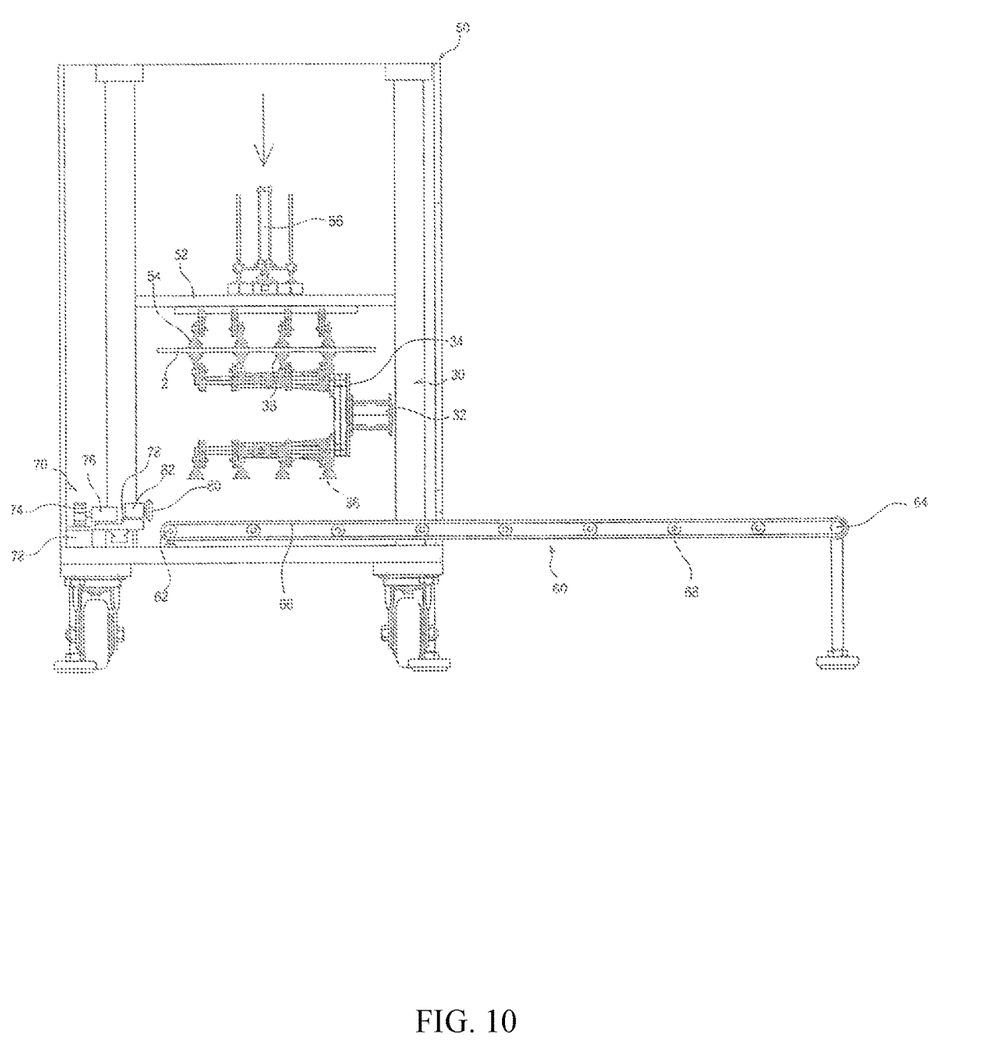

As shown in FIGS. 7 and 8, the trimming work part 50 includes a raising and lowering stand, the raising and lowering stand, a conveyor unit, and a cutting unit.

While the GRP door skin 2 supplied from the GRP sheet inserting and GRP door skin removing part 30 is securely absorbed by an absorber 54, the raising and lowering stand 52 raises and lowers the GRP door skin 2 with movement of a cylinder 56, and the raising and lowering stand 52 supplies the GRP door skin 2 absorbed by the absorber 54 to the conveyor unit 60.

The conveyor unit 60 is located below the raising and lowering stand 52, and while the conveyor unit 60 supports the GRP door skin 2 lowered with driving of the raising and lowering stand 52, after the cutting unit 70 cuts burrs formed on outer surfaces of the GRP door skin 2, the conveyor unit 60 is operated to take out the GRP door skin 2 from the trimming work part 50.

The conveyor unit 60 includes a driving pulley 62 rotated by power of a motor, and a driven pulley 64 located opposite to the driving pulley 62 and connected to the driving pulley 62 with a belt 66. The cutting unit 70 removes burrs formed on the outer surfaces of the GRP door skin 2 as the belt 66 supports the GRP door skin 2 with lowering movement of the raising and lowering stand 52, and then the belt 66 is rotatably moved by power of the motor to take out the GRP door skin 2 from the trimming work part 50. At least one or more guide rollers 58 are installed between the driving pulley 62 and the driven pulley 64 to guide movement of the GRP door skin 2.

Four cutting units 70 are arranged with the same structure on front, rear, left, and right surfaces of the bottom of the trimming work part, and the GRP door skin 2 is placed on an upper surface of the belt 66 after the raising and lowering stand 52 is lowered, the cutting units 70 cut the outer surfaces of the GRP door skin 2 at the same time to remove the burrs. At this point, as the GRP door skin 2 is placed on the belt 66 while being absorbed by the absorber 54 installed at the raising and lowering stand 52, shaking of the GRP door skin 2 can be prevented in the cutting process.

Furthermore, the four cutting units 70 are arranged with the same structure on the front, rear, left, and right surfaces of the bottom of the trimming work part, as described above, so that in operation of the cutting units, the cutting units 70 are operated at the same time to cut the outer surfaces of the GRP door skin 2 at the same time to remove the burrs.

In representatively describing the structure of the cutting units 70, each cutting unit 70 is configured to allow a cutting blade 80 to be brought into contact with one outer surface of the GRP door skin 2, and then to rotate the cutting blade 80 at high-speed and simultaneously to linearly reciprocate the cutting blade 80 along the outer surface of the GRP door skin 2 to remove the burrs formed on the outer surface of the GRP door skin 2.

Each of the cutting units 70 includes a rack gear 72 installed at the bottom of the trimming work part, a pinion 74 engaged with the rack gear 72 and rotated by power of a motor 76, a reciprocating stand 78 supporting the motor 76 coupled with the pinion 74 and linearly moved on the rack gear 72 with rotary movement of the pinion 74, and the cutting blade 80 installed at the reciprocating stand 78 and rotated at high speed by power of a motor 82.

Each of the cutting units 70 is configured such that after the GRP door skin 2 is placed on the upper surface of the belt 66 of the conveyor unit 60 with movement of the raising and lowering stand 52, the pinion 74 is rotated with driving of the motor 76. As such, the reciprocating stand 78 is linearly moved on the rack gear 72 and moves the cutting blade 80 along one outer surface of the GRP door skin 2 to remove the burrs formed on the outer surface of the GRP door skin 2. At this point, the four cutting units 70 are arranged with the same structure as described above, so that the four cutting units 70 remove the burrs formed on four outer surfaces of the GRP door skin, at the same time, and the work is rapidly finished.

The GRP door skin 2 without the burrs by driving the cutting units 70 is released from absorption by the absorber 54 of the raising and lowering stand 52, the raising and lowering stand 52 is restored to an initial state thereof, and then the GRP door skin 2 without the burrs is taken out from the trimming work part 50 while being placed on the belt 66, with movement of the belt 66 rotated by power of the motor.

Meanwhile, the GRP door skin 2 taken out from the trimming work part 50 is absorbed by the second absorber 38 of the GRP sheet inserting and GRP door skin removing part 30 described above, and then the GRP door skin 2 is transferred to a carrying box 90 to successively stack the GRP door skin 2 of a completed product.

Hereinbelow, a process of molding the GRP door skin by using the molding apparatus for a GRP door skin according to the present disclosure will be described with reference to FIGS. 1 to 12.

First, after a worker places a GRP sheet on the holding frame of the GRP sheet supply part 10, the holding frame is raised by power of the motor and then is automatically moved to the approach location of the robot arm constituting the GRP sheet inserting and GRP panel removal part.

Next, the robot arm 32 of the GRP sheet inserting and GRP panel removal part 30 is driven to absorb the GRP sheet 1 stacked on the holding frame by using the first absorber 36, and places the GRP sheet 1 on the lower mold of the forming mold, and absorbs the GRP door skin 2 of a completed product, which is inserted in the core of the upper mold 42, with the second absorber 38, and then takes out from the absorbed GRP door skin 2 from the upper mold 42.

Next, the GRP door skin 2 taken out from the upper mold 42 is inserted into the trimming work part 50, thereby removing the burrs formed on the outer surfaces of the GRP door skin 2 in the process of molding the GRP door skin 2 in the forming mold.

In other words, the GRP door skin 2 absorbed by the second absorber 38 of the GRP sheet inserting and GRP panel removal part 30 is transferred to the raising and lowering stand 52 of the trimming work part 50 as the robot arm 32 is driven, and then the GRP door skin 2 is absorbed by the absorber 54 provided at the raising and lowering stand 52.

After the GRP door skin 2 is absorbed by the raising and lowering stand 52, the raising and lowering stand 52 is lowered by driving the driving part and the absorbed GRP door skin 2 is placed on the belt 66 of the conveyor unit 60 installed below the raising and lowering stand 52.

Next, the four cutting units 70 installed below the trimming work part 50 are operated at the same time while being respectively located at the outer surfaces of the GRP door skin 2 placed on the belt 66, and cut and remove the burrs formed on the outer surfaces of the GRP door skin 2 at the same time.

In other words, after the GRP door skin 2 is placed on the upper surface of the belt 66 of the conveyor unit 60 with movement of the raising and lowering stand 52, the pinion 74 is rotated by driving of the motor. Accordingly, the reciprocating stand 78 is linearly moved on the rack gear 72 to move the cutting blade 80 along each outer surface of the GRP door skin 2 to remove the burrs formed on each outer surface of the GRP door skin 2. At this point, the four cutting units 70 with the same structure are separately installed at four locations of the outer surfaces of the GRP door skin 2 so as to remove the burrs formed on the outer surfaces of the GRP door skin 2 at the same time, so that the work can be rapidly finished.

Figure 11:
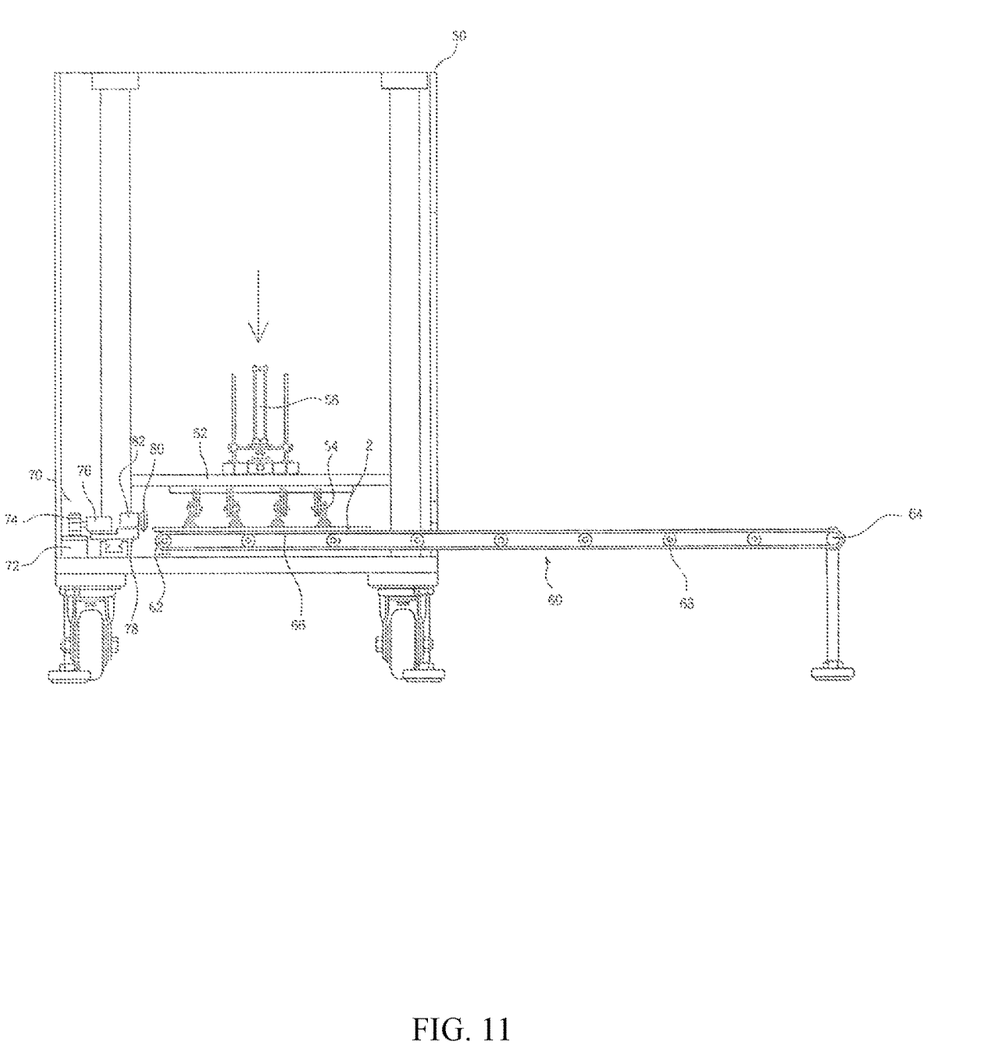

Next, as shown in FIG. 11, the GRP door skin 2 without the burrs by trimming work is released from absorption by the absorber 54 of the raising and lowering stand 52, the raising and lowering stand 52 is restored to an initial state thereof, and then the GRP door skin 2 without the burrs is taken out from the trimming work part 50 while being placed on the belt 66, with movement of the belt 66 rotated by power of the motor 52.

Figure 12:
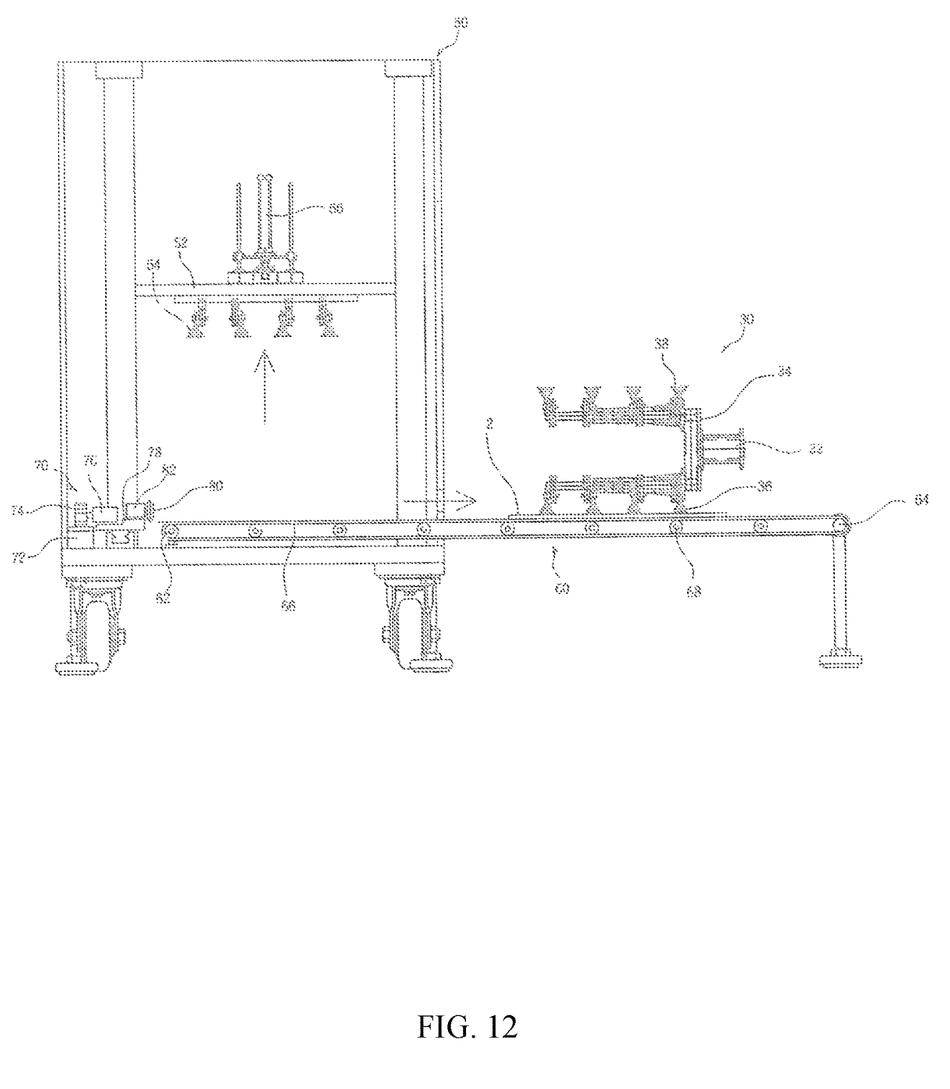

Meanwhile, as shown in FIG. 12, when the GRP door skin 2 is taken out from the trimming work part 50, the GRP sheet inserting and GRP door skin removing part 30 supplies a new GRP door skin 2 for trimming burrs to the raising and lowering stand 52 of the trimming work part 50, and then absorbs the GRP door skin 2 of a completed product without the burrs, takes out the GRP door skin 2 from the trimming work part 50, and then transfers the absorbed GRP door skin 2 to the carrying box 90 and successively stacks the GRP door skin 2 of a completed product.

In other words, with movement of the robot arm 32, the GRP door skin 2 taken out from the forming mold 40 while being absorbed by the second absorber 38 is directly supplied to the raising and lowering stand 52 of the trimming work part 50 and is securely absorbed by the absorber 54 of the raising and lowering stand 52. Then, with movement of the robot arm 32, the first absorber 36 absorbs the GRP door skin 2 of a completed product without the burrs while being taken out from the trimming work part 50 and then transfers the absorbed GRP door skin 2 to the carrying box 90.

What is claimed is:

1. A molding apparatus for a glass fiber reinforced plastic (GRP) door skin, comprising:
   a driving pulley configured to be rotated by power of a first motor;
   a driven pulley spaced below the driving pulley at a predetermined distance;
   a chain configured to be rotatably moved while being wound on the driving and driven pulleys;
   a GRP sheet supply part comprising a holding frame provided along the chain and spaced at a predetermined distance from another holding frame and wherein the holding frame is configured to ride on the chain and be rotatably moved while holding a GRP sheet;
   a robot arm located behind the GRP sheet supply part and configured to operate according to a control signal preset in a control unit;
   a plate provided on the robot arm;
   a GRP sheet inserting and GRP panel removal part comprising a first absorber installed on a first surface of the plate and configured to absorb the GRP sheet held by the holding frame;
   a lower mold located behind the GRP sheet inserting and GRP panel removal part and wherein the lower mold is configured to receive the GRP sheet from the first absorber;
   a forming mold comprising an upper mold configured to be joined to the lower mold while being located above the lower mold, and wherein the forming mold is configured to form the GRP sheet into a GRP door skin;
   a second absorber provided at a second surface of the plate and configured to take out the GRP door skin from the forming mold with a movement of the robot arm;
   a housing located at a side space of the forming mold and having a working space in the housing;
   a raising and lowering stand provided in the working space of the housing and configured to be supplied with the GRP door skin taken out from the forming mold and to securely absorb the GRP door skin with a third absorber;
   a belt located below the raising and lowering stand and configured to support the GRP door skin lowered by a vertical movement of the raising and lowering stand;
   a conveyor unit comprising driving and driven pulleys provided at opposite ends of the belt and configured to rotatably move the belt by power of a second motor;
   a tack gear provided along an outer portion of a bottom of the housing;
   a pinion engaged with the rack gear and configured to be rotated by power of a third motor;
   a reciprocating stand supporting the third motor and configured to reciprocate on the rack gear with a rotation of the pinion; and a trimming work part comprising a cutting unit comprising a cutting blade and wherein the reciprocating stand is configured to cause the cutting blade to reciprocate along outer surfaces of the GRP door skin to remove burrs generated on the outer surface of the GRP door skin.

2. The molding apparatus according to claim 1, wherein the cutting unit comprises four cutting units having the same structure, the four cutting units being provided at front, rear, left, and right portions of the bottom of the housing to simultaneously remove the burrs generated on the outer surfaces of the GRP door skin.

\* \* \* \* \*